US009258640B2

(12) United States Patent
Kukurudza

(10) Patent No.: US 9,258,640 B2
(45) Date of Patent: Feb. 9, 2016

(54) COMPACT NOISE SUPPRESSION CIRCUIT FOR SMALL SPEAKERS

(76) Inventor: Vladimir Walter Kukurudza, Toronto (CA)

( * ) Notice: Subject to any disclaimer, the term of this patent is extended or adjusted under 35 U.S.C. 154(b) by 802 days.

(21) Appl. No.: 13/137,529

(22) Filed: Aug. 24, 2011

(65) Prior Publication Data

US 2012/0045079 A1 Feb. 23, 2012

(51) Int. Cl.

| | |
|---|---|
| ***H04B 15/00*** | (2006.01) |
| ***H04R 3/00*** | (2006.01) |
| ***H01F 19/02*** | (2006.01) |
| *G10L 21/0208* | (2013.01) |
| *H04R 1/10* | (2006.01) |
| *H04R 5/04* | (2006.01) |

(52) U.S. Cl.

CPC .................. *H04R 3/00* (2013.01); *H01F 19/02* (2013.01); *G10L 21/0208* (2013.01); *H04R 1/1033* (2013.01); *H04R 5/04* (2013.01)

USPC ........................... 381/94.1; 381/300; 336/220

(58) Field of Classification Search

None

See application file for complete search history.

(56) References Cited

U.S. PATENT DOCUMENTS

| | | | | |
|---|---|---|---|---|
| 5,519,781 | A | 5/1996 | Kukurudza | |
| 5,615,272 | A | 3/1997 | Kukurudza | |
| 5,891,183 | A * | 4/1999 | Zierhofer | 607/57 |
| 2002/0130752 | A1 * | 9/2002 | Kuroshima et al. | 336/200 |
| 2007/0098189 | A1 * | 5/2007 | Kukurudza | 381/117 |

FOREIGN PATENT DOCUMENTS

| | | |
|---|---|---|
| CA | 2192163 | 9/1995 |

* cited by examiner

*Primary Examiner* — Davetta W Goins
*Assistant Examiner* — James Mooney

(57) ABSTRACT

A compact noise suppression circuit for a small speaker system and having a circuit board with a left signal input connection and a right signal input connection and a ground connection, and further having a left speaker supply connection and a left speaker return connection, and a right speaker supply connection and a right speaker return connection, and further having a left bifilar coil and a right bifilar coil, and left and right coil connections on the circuit board, and means securing said left and right bifilar coils to respective coil connections on the circuit board. Also disclosed is a compact portable audio player system incorporating such a noise suppression circuit, and a noise suppression circuit for a monaural signal system.

2 Claims, 5 Drawing Sheets

COMPACT NOISE SUPPRESSION CIRCUIT FOR SMALL SPEAKERS

FIELD OF THE INVENTION

This application is based on PCT/CA/2010/000220 filed Feb. 19, 2010, which claimed priority on Canada App Sn. 2655586 Filed Feb. 25, 2009, title, COMPACT NOISE SUPPRESSION CIRCUIT FOR SMALL SPEAKERS, inventor Vladimir W Kukurudza. The invention relates to small portable audio player systems with a head set, and to a noise suppression circuit on a compact circuit board particularly adapted to use with small speakers, such as portable head sets. The circuit provides a reduction in noise induced in conventional speaker circuits, and enhances sound quality.

BACKGROUND OF THE INVENTION

Small speakers, such as are used in head sets, especially of the type used in portable audio devices, such as audio players, cell phones, and in some cases in security head sets, and military systems, and possibly also in hearing aids, are of compact minimal size, for obvious reasons.

As a result, even though the audio quality of the actual signal may be adequate, the quality of the audio sound delivered by the speakers is often much less than is desirable. This is partly due to the limitations imposed in the design by the small size of the speakers themselves.

However it is found that much of the loss of quality is due to noise induced in the speaker circuits. If this induced noise can be eliminated then the audio quality of the sound from the speakers will be both much higher, and of greater clarity.

The signals may come from sources such as tape, CD, or memory chip, or may be communication signals such as mobile phones, radio communication, or possibly hearing aids.

The audio signals are usually stereo sound signals. These stereo signals are supplied as left and right hand signals. Both include what can be broadly described as combining both high, medium, and low frequencies. Circuits usually provided in such speakers this purpose are usually miniature in scale and somewhat primitive. The speakers themselves also incorporate speaker coils, and they are believed to contribute to the electronic noise.

In prior U.S. Pat. Nos. 5,615,272, and 5,519,781 and Canadian Patent 2,192,163 . . . . Inventor V. W Kukurudza, there are disclosed noise suppression circuits incorporating special “bifilar” wound coils. These bifilar coils actually comprise two coils in one. A pair of such bifilar coils is preferably used in each noise suppression circuit. The bifilar coils produce a substantial reduction in electronic noise in the circuit. The bifilar coils also help to reduce the electronic noise originating in the speaker coils themselves. However when it is attempted to provide a miniaturised noise suppression circuit with such bifilar coils, of an extremely compact size, for use in the type of head sets or speaker systems described above, numerous other problems arise.

The bifilar coils develop significant internal stresses during operation. The coils must be secured so as to withstand these stresses. Not only must the bifilar coils be securely mounted, but also they must be maintained in spaced apart relation, so as to avoid magnetic coupling between the one pair of bifilar coils and the other pair.

The bifilar coils also must be supported in such a way that any heat can be dissipated, without affecting either the bifilar coils or the circuit board, or the head set system, and without impairing the performance of the bifilar coils themselves.

BRIEF SUMMARY OF THE INVENTION

With a view to achieving a solution to these complex and conflicting problems the invention comprises a compact noise suppression circuit for a small speaker system and having a circuit board with a left signal input connection and a right signal input connection and a ground connection, and further having a left speaker output connection and a left speaker return connection, and a right speaker output connection and a right speaker return connection, and further having a left bifilar coil unit and a right bifilar coil unit, and having a group of four left coil connections, and a group of four right coil connections on said circuit board, respective groups being spaced apart from one another for supporting respective left and right coils in secure relation spaced apart from one another, and means securing said left and right bifilar coil units to respective said coil connections on said circuit board, and conductors in said circuit board.

Preferably the invention provides a compact noise suppression circuit having the foregoing features and further having a first circuit board end and a second circuit board end, with said left signal input and right signal input and ground connection arranged side by side at said first end, and with said left speaker supply and said left speaker return, and said right speaker supply and said right speaker return connection side arranged by side at said second end.

Preferably the invention provides a compact noise suppression circuit having the foregoing features and further wherein said left bifilar coil unit comprises a first left bifilar coil and a second left bifilar coil with respective windings wound together with alternate windings adjacent to one another, and wherein said left bifilar coil connection comprises a first left bifilar coil input connection and a first left bifilar coil output connection and a second left bifilar coil input connection and a second left bifilar coil out put connection.

Preferably the invention provides a compact noise suppression circuit having the foregoing features and further wherein said right bifilar coil unit comprises a first right bifilar coil and a second right bifilar coil with respective windings wound together with alternate windings adjacent to one another and wherein said right bifilar coil connection comprises a first right bifilar coil input connection and a first right bifilar coil output connection and a second right bifilar coil input connection and a second right bifilar coil out put connection.

Preferably the invention provides a compact noise suppression circuit having the foregoing features and further wherein said second left bifilar coil output connection and said second right bifilar coil output connection are both connected by a common conductor to the ground connection.

Preferably the invention provides a compact noise suppression circuit having the foregoing features and further wherein the two bifilar coil units are mounted side by side with their central axes parallel and perpendicular to the circuit board.

Preferably the invention provides a compact noise suppression circuit having the foregoing features and further wherein there is a predetermined spacing between the two bifilar coil units.

The invention also provides a portable audio reproduction device comprising a signal source such as a memory, for source of audio signals, a head set having left and right speakers, and a wire harness connecting said memory source and said head set, and a compact noise suppression circuit incorporated in said wire harness.

According to a further embodiment the invention can be adapted for use with mon-aural audio signals. In this case the noise suppression circuit board will have only one half of the circuits described, using a single bi-filar coil unit. Two such mon-aural circuits can also be adapted to a stereo signal source, by simply incorporating one such mon-aural circuit in each side of the stereo system, on in each of two ear phones.

The circuits according to the invention can also be incorporated in an amplifier if desired.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

DESCRIPTION OF A SPECIFIC EMBODIMENT

Figure 1:
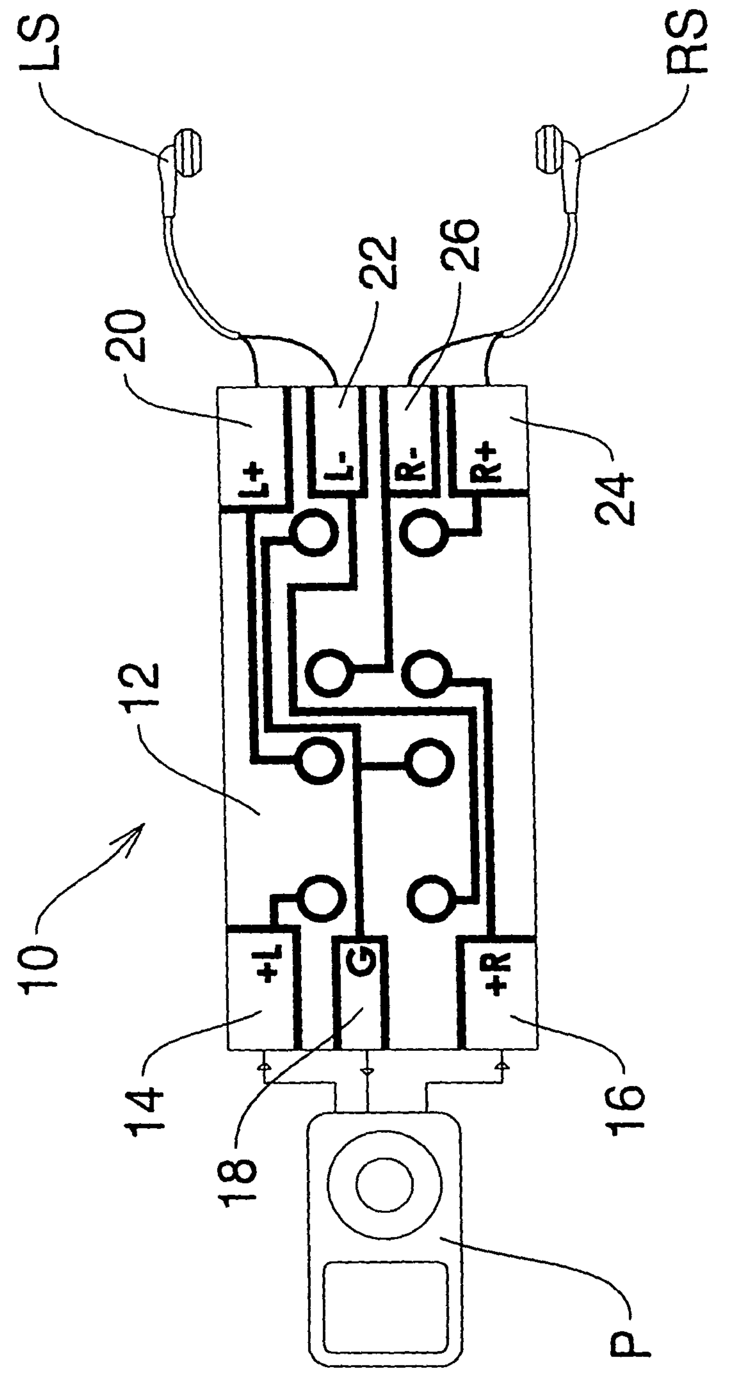
FIG. 1 is a schematic plan view of a typical small portable audio player device, with a pair of speakers, and a compact noise suppression circuit illustrating the invention.

FIG. 1 is intended to illustrate a typical small portable audio device, with a head set.

It could be a portable tape player, CD player, or one of the solid state chip players, such as MP3, IPOD (trade mark) or similar. It could also be a mobile phone, or security, military or other small device. The signals may be recorded or may be live transmissions.

In the illustrated system there is a player unit (P), left and right ear speakers (LS) and (RS), and a compact noise suppression circuit (10). Typically such portable devices have a wiring harness consisting of single electric cord plugged in to the player unit P itself, and the cord divides into two, one going to respective left and right ear speakers LS and RS.

In the majority of these audio devices the signals recorded, and thus supplied by the device are already a stereo pair of signals.

Thus there will be left signals and right signals. The left and right signals will both incorporate a mix of low and high frequencies. However the left signals mix will be different from the right signal mix, since they are stereo signals. The actual speakers will be single left and right speakers, each speaker reproducing all frequencies.

There are no multiple speakers responding separately to high, mid range, or low frequencies.

The problem of circuit noise is thus possibly more acute in these simple systems than it is in high fidelity systems have several speakers, for various frequencies. Where all frequencies must pass through the same speaker, then the distortion, especially at the mid and high frequency levels, will be all the more noticeable.

In addition, given the extreme miniaturisation of the component dimensions, the small size of the speakers themselves still further leads to distortion and lack of fidelity.

Figure 2:
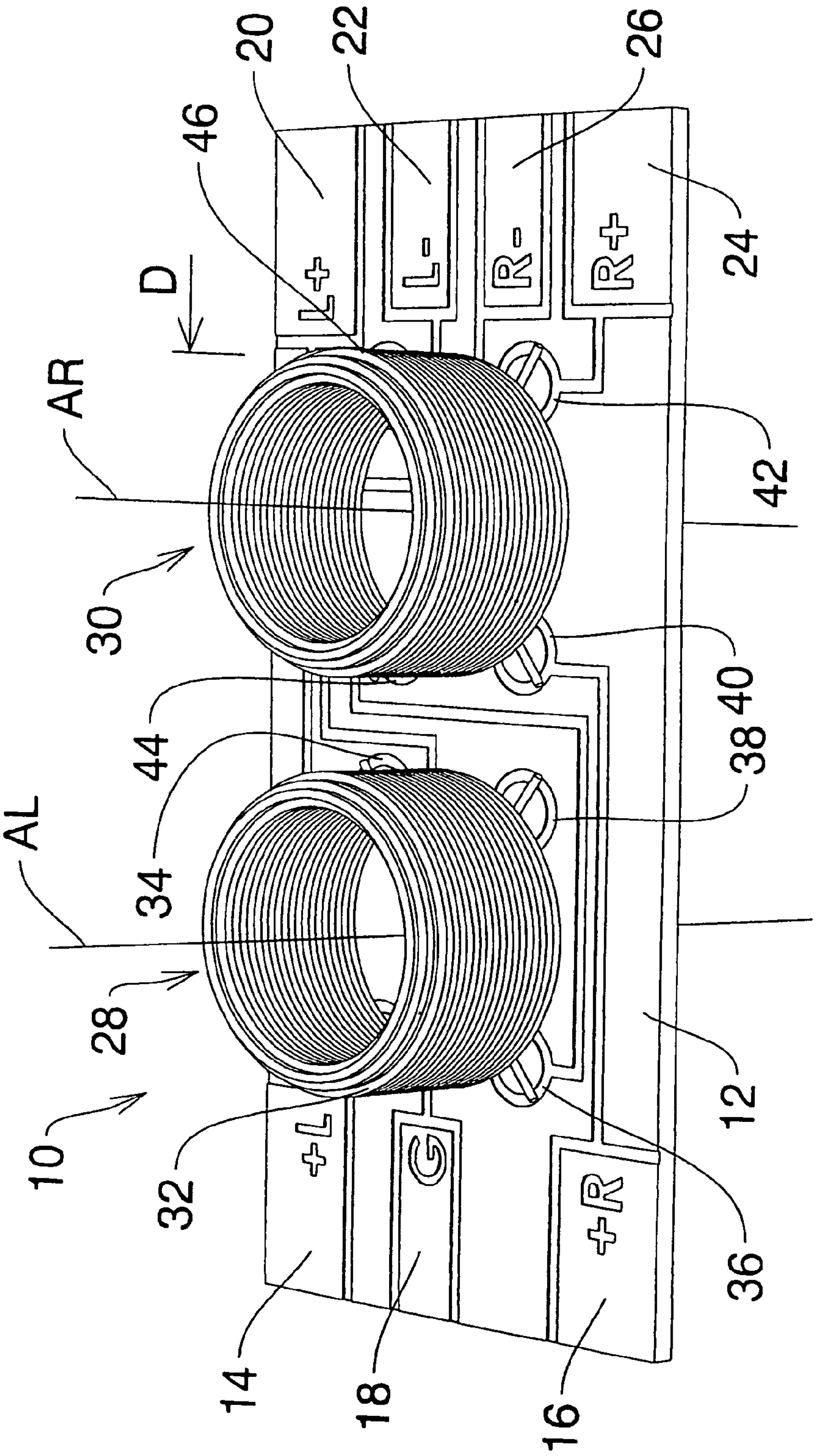
FIG. 2 is a perspective of a noise suppression circuit and circuit board illustrating the invention.
Figure 3:
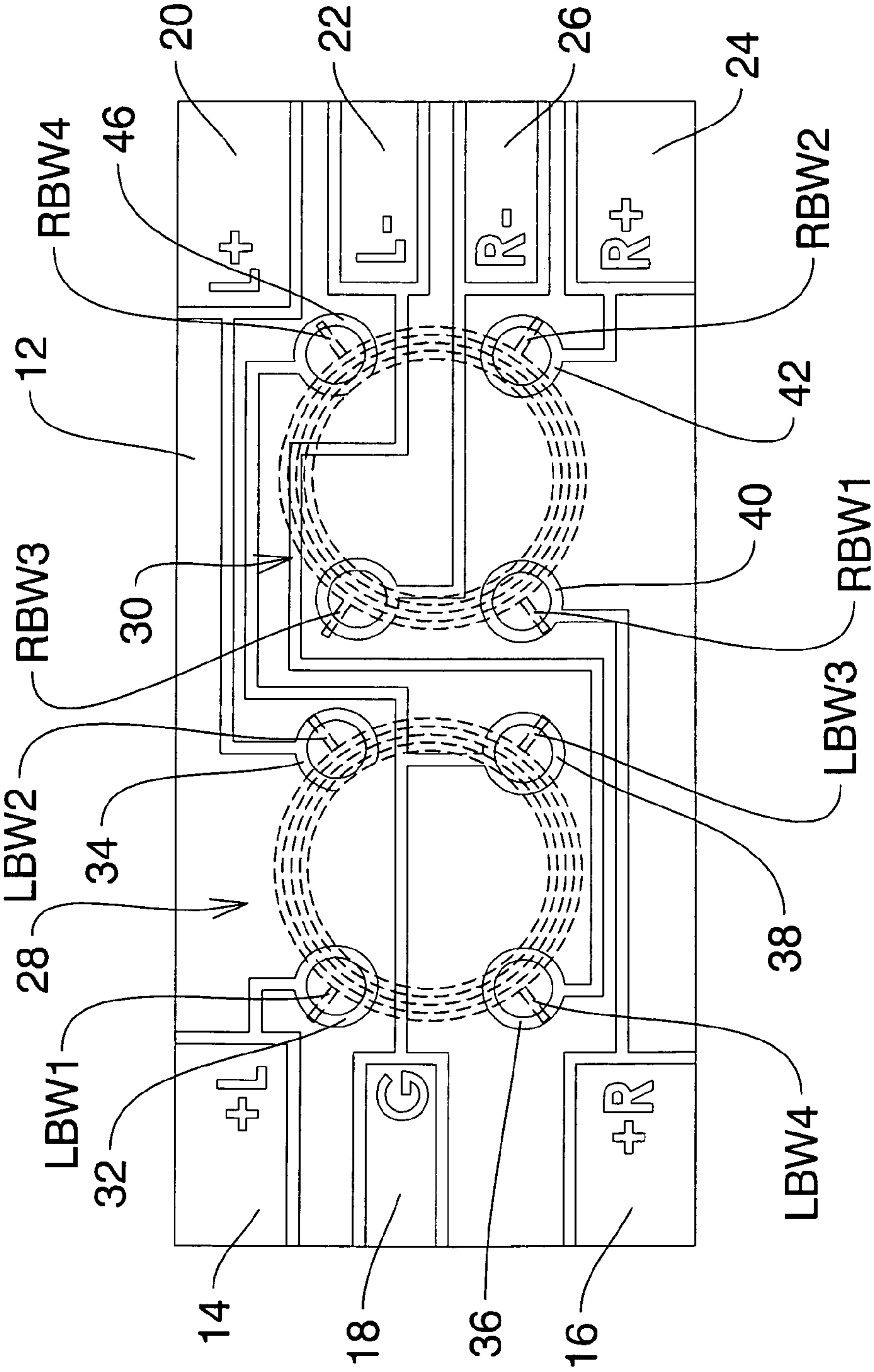
FIG. 3 is a plan view of the circuit board.

FIGS. 2 and 3 illustrates a suitable compact noise suppression circuit board (10) of compact size. This can be as small as no more than 6 mm wide and 16 mm long. This is small enough to be fitted in a small housing (not shown) and incorporated in almost any form of wiring harness connecting to a small head set pair. Alternatively it could be fitted into a compact housing (not shown) for use in a single ear speaker system such as may be used in cell phones, military or surveillance systems, or even some hearing aids.

The circuit board (12) has a left signal input (14) and a right signal input (16), and a ground (18) at one end of the board, for connection to the player P, as shown.

The circuit board (12) carries on it a left bifilar coil unit (28) and a right bifilar coil unit (30). These left and bifilar right coil units are located with their coil central axes perpendicular to the circuit board (12) and with their axes spaced apart and parallel to one another to reduce interference between the two bifilar coil units.

Each of the left and right bifilar coil units consists of a pair of first and second coils wound together. The turns of the first coil are interleaved with the turns of the second coil, alternately side by side along the coil, (see FIG. 4).

The circuit board (12) has a left bifilar group of four connection points comprising first left coil input (32), first left coil output (34), and second left coil input (36), and second left coil output (38) connection points, for the first and second coils of the left bifilar coil unit (28).

The first coil of the left bifilar coil unit (28) is connected to said first left input (32) and first left output (34) connection points on said circuit board.

The second coil of the left bifilar coil unit is connected to said second left input (36) and second left output (38) connections on said circuit board.

The left bifilar coil unit (28) has four connecting wires, namely two wires for the first coil lbw 1, lbw 2, and two wires for the second coil, lbw 3 and lbw 4.

The wires extend out radially from four spaced points around the perimeter of the left bifilar coil unit (28).

The respective wires are attached eg by solder to the respective ones of the four left coil connection points (32), (34), (36), and (38).

The circuit board (12) has a right bifilar group of four connection points comprising first right coil input (40), first right coil output (42), and second right coil input (44), and second right coil output (46) connection points, for the first and second coils of the right bifilar coil unit (30).

The first coil of the right bifilar coil unit (30) is connected to said first right coil input (40) and first right coil output (42) connections on said circuit board.

The second coil of the right bifilar coil unit (30) is connected to said second right coil input (44) and to second right coil output (46) connections on said circuit board (12).

The right bifilar coil unit (30) has four connecting wires rbw 1, rbw 2, rbw 3, and rbw 4.

The wires extend out radially from four spaced points around the perimeter of the right bifilar coil unit (30)

The respective wires are attached eg by solder to the respective ones of the four right coil connections (40), (42), (44), and (46).

In this way both the left bifilar coil unit (28) and the right bifilar coil unit (30) are securely attached by their respective four wires extending radially from four points spaced around the perimeter of each bifilar coil unit.

Each of the left and right bifilar coil units defines an annular wire body with a central axis.

The left bifilar coil unit axis is marked AL, and right bifilar coil unit axis is marked AR respectively.

The two axes are located spaced apart along the circuit board (12) and extend parallel to one another, normal to the board.

Each of the bifilar coil units has a diameter (D). The left and right coils are spaced apart by a distance at least equal to about 0.25 D, or greater.

Figure 4:
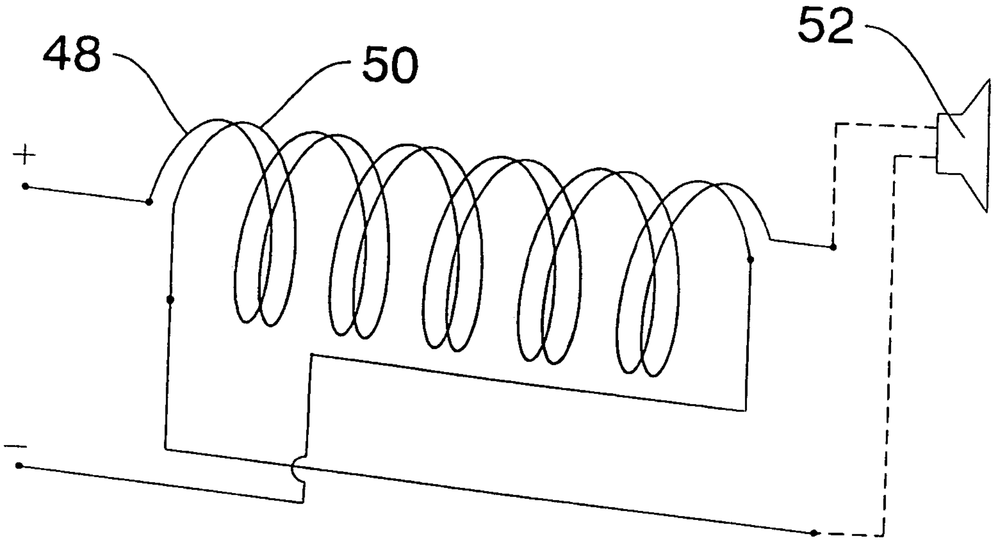
FIG. 4 is a schematic view of one bifilar coil unit, illustrating the first and second coils, with respective windings alternating with one another.

The intertwining of the two wires of a bifilar coil are shown schematically in FIG. 4. It will be seen that the first coil (48) and second coil (50) are wound together, side by side, and extending in the same direction.

In FIG. 4 the first coil (48) is connected to supply signals to the speaker (52).

The second coil (50) is connected to receive return signals from the speaker, and return them to ground.

The first and second left coils are wound so that their turns start together at one end and end together at the other end of the left bifilar coil unit. This ensures that all the left signals pass through the first left coil, then through the left speaker, and then through the second left coil, and pass in the same direction, through both the first and the second left coils. The first and second right coils are wound so that their turns start together at one end and end together at the other end of the right bifilar coil unit. This ensures that all the right signals pass through the first right coil, then through the right speaker, and then through the second right coil, and pass in the same direction, through both the first and the second right coils.

There is no diversion of any portion of the respective left and right frequency mixes, but the all pass through their respective speakers.

Figure 5:
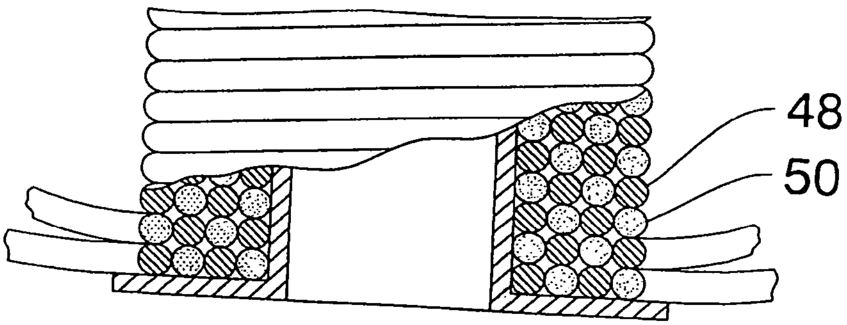
FIG. 5 is a side elevation partly cut away of a typical bifilar coil unit, and, FIG. 6 is a schematic diagram of a noise suppression circuit for a single speaker or single ear phone mon-aural system.

FIG. 5 shows a side elevation of a typical bifilar coil, partly cut way. The wire turns of the two separate coils (48) and (50) are hatched in distinctive hatching to show the way in which they are wound alternately with each other.

As shown in FIGS. 2 and 3, the wire lbw1 of the first coil of the left bifilar coil unit is connected to the left signal input connection (14) via connection point (32).

The wire lbw 2 of the first coil in left bifilar coil unit (28) is connected to the left speaker supply (20), via connection point (34) to supply signals to left speaker (54).

The wire lbw 3 connects the second coil of left bifilar coil unit (28) via connection point (36) to the return connection (22) for left speaker (LS).

The wire lbw 4 connects the second coil of the left bifilar coil unit (28) via connection point (38) to the ground connection (18).

The right bifilar coil unit (30) is connected in essentially the same way for the right speaker (RS)

The wire rbw1 of the first coil of the right bifilar coil unit (30) is connected via connection point (40) to the right signal input connection (16).

The wire rbw 2 of the first coil in right bifilar coil unit (30) is connected via connection point (42) to the right speaker supply (24).

The wire rbw 3 connects the second coil of right bifilar coil unit (30) via connection point (44) to the right speaker return (26).

The wire rbw 4 of the second coil of the right bifilar coil unit (30) is connected via connection point (46) to the ground connection (18).

Thus the first and second coils of each of the left and right bifilar coil units (28) and (30) are joined, in series, with their respective speakers (LS), and (RS).

Respective complete mixes of left and right signals pass continuously in series, from the inputs of the respective first coils to their outputs, and then through their respective speakers and then to the input of the second coil and then to its output, and so to ground (18).

It will be noted that, as explained with FIG. 4, the signals in each of the bifilar coil units flow in one direction in the first coil and in the same direction in the second coil. However the timing of the signal passing through the second coil is delayed slightly out of phase with the timing of the same signal passing through the first coil. As a result the inductances in the first and second coils cancel out, but the fields remain. This has the effect of suppressing noise signals which would other wise be generated in the circuit.

In another embodiment the circuit can be modified for use with mon-aural signals.

This may be useful for hearing aids, short wave radio, security systems and military applications, and any other such system where the requirement for stereo signals is less important.

In this case the noise suppression circuit can be essentially cut in half.

Figure 6:
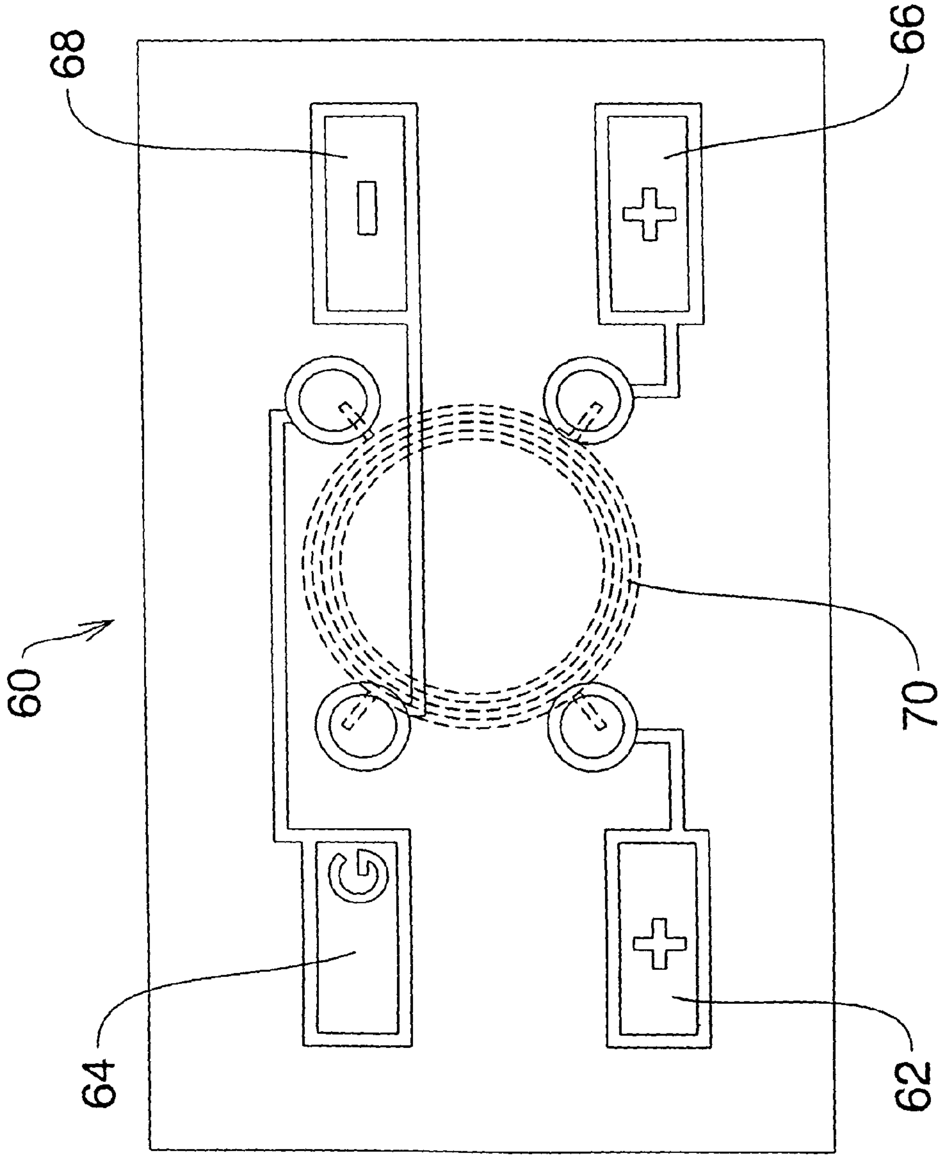

FIG. 6 shows such a mon-aural noise suppression circuit (60)

Such a circuit has an input (62) and a ground (64), at one end of the board, at the other end there is speaker supply (66) and a speaker return (68).

A single bi-filar coil unit (70), having first and second coils, as before, is connected.

The first coil is connected between the input (62) for the signal and the speaker supply (66).

The second coil is connected between the speaker return (68) and the ground (64).

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A compact noise suppression circuit for an audio player system having a source of left and right stereo audio signals for respective left and right speakers comprising:

a circuit board with a left signal input connection and a right signal input connection for receiving respective said left and right stereo audio signals and a ground connection;

a left speaker supply connection and a left speaker return connection on said board;

a right speaker supply connection and a right speaker return connection on said board;

two separate first left coil connections on said circuit board;

two separate second left coil connections on said circuit board, spaced from said first left coil connections;

two separate first right coil connections on said circuit board, spaced from said left coil connections;

two separate second right coil connections on said circuit board, spaced from said left coil connections and from said first right coil connections;

a left bifilar coil unit attached to said first and second left coil connections on said circuit board;

wherein said left bifilar coil unit comprises a first left coil and a second left coil with respective coil windings wound together with alternate first and second coil windings adjacent to one another, and wherein said left bifilar coil connection comprises a first left coil input connection and a first left coil output connection and a second left coil input connection and a second left coil output connection;

a right bifilar coil unit attached to said first and second right coil connections on said circuit board, wherein said right bifilar coil unit comprises a first right coil and a second right coil with respective coil windings wound together with alternate first and second coil windings adjacent to one another and wherein said right bifilar coil connection comprises a first right coil input connection and a first right coil output connection and a second right coil input connection and a second right coil output connection;

wherein said left bifilar coil unit defines a central axis and wherein said left bifilar coil unit is mounted with its said central axis perpendicular to said circuit board, and wherein said right bifilar coil unit defines a central axis and wherein said right bifilar coil unit is mounted with its said central axis perpendicular to said circuit board; and wherein said left bifilar coil unit and said right bifilar coil unit each define a diameter D and wherein said left bifilar coil unit and said right bifilar coil unit are mounted with a spacing between them equal to not less than 0.25 D; and wherein said first coil output connection of said left bifilar coil unit is connected to said supply for said left speaker, and wherein said return of said left speaker is connected to said input of said second coil of said left bifilar coil unit and wherein said first coil output of said right bifilar coil unit is connected to said supply for said right speaker, and wherein said return of said right speaker is connected to said input of said second coil of said right bifilar coil unit, whereby all left speaker signals from said player pass directly to said left coil unit and to said left speaker and back through said left second coil without diversion, and whereby all the right stereo signals from said player pass directly through said first right coil unit and to said right speaker and back through said second right coil without diversion.

2. A compact noise suppression circuit as claimed in claim 1 further comprising a first circuit board end and a second circuit board end, with said left signal input and right signal input and ground connection arranged side by side at said first end, and with said left speaker supply and said left speaker return and said right speaker supply and said right speaker return connection arranged side by side at said second end.

* * * * *